Patented May 8, 1934

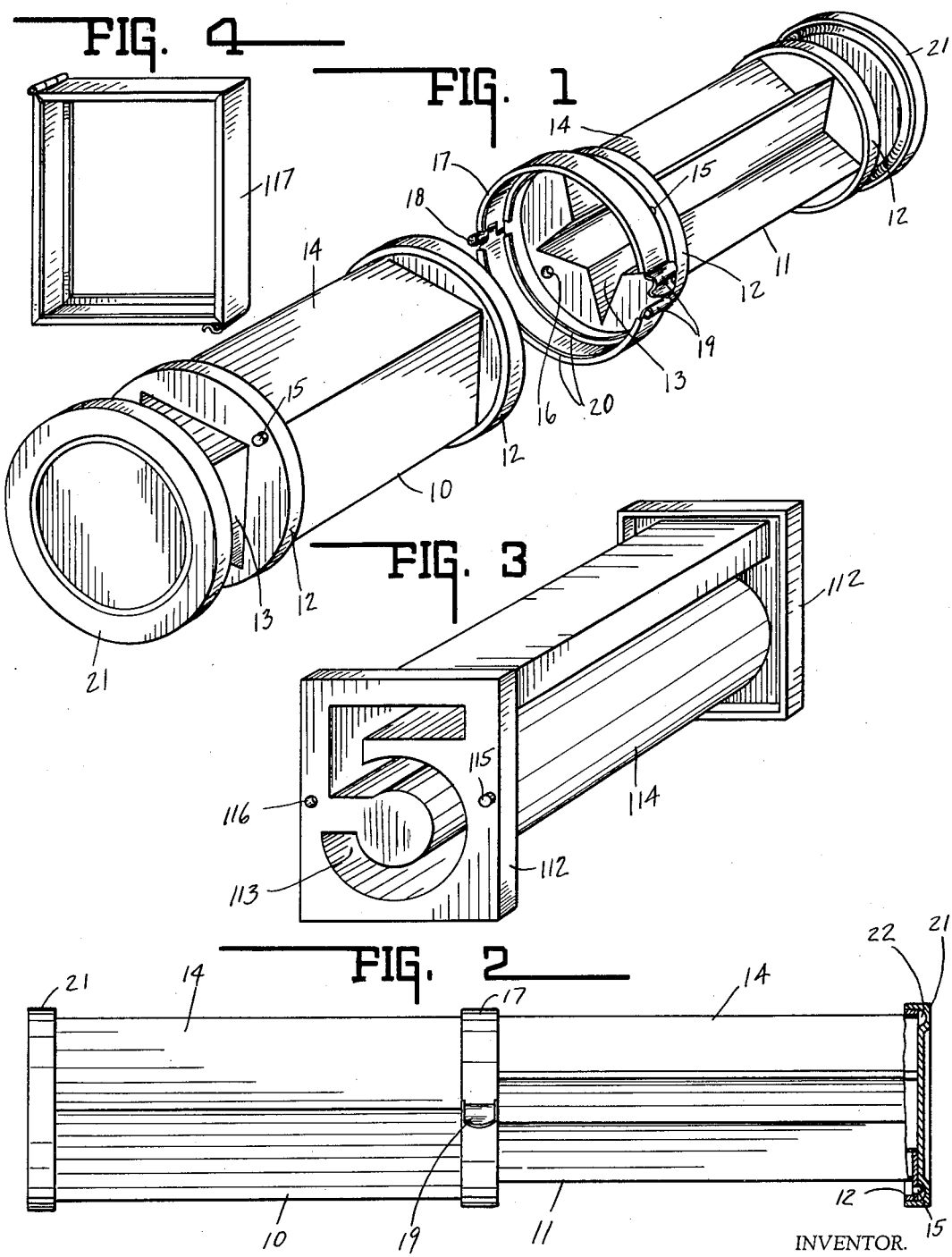

1,957,865

UNITED STATES PATENT OFFICE 1,957,865

MOLD FOR ICE CREAM AND THE LIKE

John A. Ueding, Jr., Vincennes, Ind.

Application July 28, 1932, Serial No. 625,399

3 Claims. (Cl. 107—19)

This invention relates to a mold for ice cream and the like which is particularly useful in making the center designs of fancy center brick ice cream. It is the present practice in the manufacture of brick ice cream in large quantities to freeze bricks in sizes of two quarts or four quarts instead of freezing a single quart at a time. This results in many economies in the manufacture. However, in the sale of fancy center ice cream, it often happens that a single order requires several quarts each having a different center design. With the apparatus heretofore in use, such an order must be filled by freezing individual quarts.

The principal object of the present invention is to provide molding apparatus by means of which the cream may be frozen in bricks larger than a quart but in which the fancy centers may be arranged to give individual designs for the different quart sections of the brick. The molding apparatus is equally useful however for the large size bricks even though the same design is required throughout.

The principal feature of the invention resides in the provision of sectional molds so arranged that several sections may be clamped together and the cream therein frozen in a unitary piece to form the heart of large sized fancy bricks. The sections so fastened together may present the same design throughout or may form different designs for each quart section but in each case the center of the large brick is produced as a unitary piece. The individual sections are so formed that they may also be used separately to form the centers of quart size bricks.

Other features of the invention reside in the specific form of the sectional mold as described in the following specification and claims and illustrated in the accompanying drawing:

Figure 1 is a perspective view showing the parts of a two quart center mold in disassembled relation, the particular mold illustrated having a diamond pattern for one quart and a star pattern for the second quart. Figure 2 is an elevational view partly in section of the mold shown in Figure 1 in a completely assembled position. Figure 3 is a perspective view of a form of mold section used for center designs consisting of letters or figures. Figure 4 is a perspective view of a form of clamp for fastening together sections of the type of mold shown in Figure 3.

In Figure 1 there is shown a mold section 10 of the proper length for one quart and forming a diamond shaped design, together with a mold section 11 for a star shaped design. Each of the mold sections 10 and 11 is formed with a flange 12 at each end, said flanges having openings 13 corresponding in shape to the desired design. The flanges 12 are connected by body portions 14 preferably formed of relatively thin sheet metal registering with the openings 13 in the flanges 12. Each of the flanges 12 is provided with a pin 15 and a recess 16 oppositely positioned to the pin. When the molds are placed end to end, pins 15 engage the recesses 16 to maintain the molds in axial alignment.

When the molds are so placed, a two-piece snap ring 17 having a hinge 18 and a snap fastener 19 is clamped about the two abutting flanges 12. The said snap ring has inwardly extending flanges 20 which engage the rear surfaces of the flanges 12 to maintain the mold sections in their united position. When the two mold sections have thus been joined, they are filled with the cream or sherbet in a partially frozen condition to form the center design of the brick. Caps 21 are then fitted over the flanges 12 on the exposed ends of the combined mold and the same is then placed in the hardening room to complete the freezing operation at a low temperature. Each of the caps 21 is provided with an internal groove 22 which receives the pin 15 and permits the cap to be placed flush against the surface of the flange 12.

When the cream in the mold has been thoroughly frozen, it is removed from the mold and placed in the usual half gallon brick mold, the remainder of the cream for the brick is packed around it and the freezing of the brick is then completed in the usual manner. By means of the specific mold herein shown, the half gallon or two quart brick may be formed having one quart with a diamond design and the second quart with the star design but with the center piece as a unitary structure. If a four quart brick were to be frozen, four sections of the mold would be joined together in the same manner as illustrated herein and the fancy centers for the entire four quart brick would be frozen as a unit. The four sections might be of any desired design, as for example, a diamond, a heart, a spade and a club, appropriate for card parties, or the four sections could be all of the same design if desired. It is apparent also that the individual sections can be used for molding the centers of single quart bricks by merely placing the caps 21 on the ends of the individual section.

The form of mold shown in Figure 3 is used where the design consists of numerals or letters and includes rectangular flanges 112 corresponding to the flanges 12 but of rectangular shape. The said flanges are provided with openings 113 having the shape of the desired design, and the mold body 114 of thin sheet metal registers with the said openings. Each of the flanges 112 is provided with a pin 115 and a recess 116 corresponding in function to the pins and recesses in the flanges 12. A rectangular snap fastener 117 shown in Figure 4 is used in joining together the sections in this mold in the same manner as the snap ring 17.

It is evident that the sectional mold herein described provides an extremely flexible type of apparatus by means of which orders for varying designs of fancy center cream may be filled without the necessity of freezing individual bricks. While a preferred form of the invention has been illustrated, the details thereof may be varied within the scope of the invention as defined by the following claims.

The invention claimed is:

1. A center mold for fancy center brick ice cream and the like including separable sections each having a cavity extending longitudinally therethrough each cavity being shaped for a different desired design, and means for uniting a plurality of said sections end to end to form a unitary mold with the said cavities communicating with each other, whereby a unitary center of varying design may be molded.

2. A center mold for fancy center brick ice cream and the like including a plurality of separable sections each having end flanges with openings therein shaped to a fanciful center design and each having body portions extending between said flanges, said portions having central cavities registering with said openings, and snap rings engaging abutting flanges on adjacent sections for connecting said sections together as a unit.

3. A center mold for fancy center brick ice cream and the like including a plurality of separable sections each having a cavity extending longitudinally therethrough shaped for a fanciful design and each having end flanges, snap rings engaging abutting flanges on adjacent sections for connecting said sections together as a unit, and closures for the open ends of said unit.

JOHN A. UEDING, JR.